(12) United States Patent
Finnell

(10) Patent No.: US 8,668,455 B2
(45) Date of Patent: Mar. 11, 2014

(54) TURBINE WHEEL

(76) Inventor: Alfred Finnell, Lake Worth, FL (US)

( * ) Notice: Subject to any disclaimer, the term of this patent is extended or adjusted under 35 U.S.C. 154(b) by 804 days.

(21) Appl. No.: 12/825,857

(22) Filed: Jun. 29, 2010

(65) Prior Publication Data

US 2011/0012363 A1    Jan. 20, 2011

Related U.S. Application Data

(63) Continuation-in-part of application No. 12/496,769, filed on Jul. 2, 2009, now Pat. No. 7,775,760.

(51) Int. Cl.
*F03D 1/00* (2006.01)

(52) U.S. Cl.
USPC ............................................... 416/132 B

(58) Field of Classification Search
USPC ........ 416/132 A, 132 B, 132 R; 415/908, 4.3, 415/4.5
See application file for complete search history.

(56) References Cited

U.S. PATENT DOCUMENTS

| | | | | |
|---|---|---|---|---|
| 243,169 | A * | 6/1881 | Sprague ................... | 416/132 R |
| 835,667 | A * | 11/1906 | Donnelly ................. | 416/132 R |
| 4,340,822 | A * | 7/1982 | Gregg ....................... | 290/55 |
| 6,320,273 | B1 | 11/2001 | Nemec | |
| 6,726,439 | B2 | 4/2004 | Mikhail et al. | |
| 6,853,096 | B1 | 2/2005 | Yu et al. | |
| 6,864,597 | B1 | 3/2005 | Ricker | |
| 6,957,946 | B1 * | 10/2005 | Vander Kley ............ | 415/4.2 |
| 7,425,774 | B2 | 9/2008 | Shibata et al. | |
| 2006/0056972 | A1 * | 3/2006 | DeLong ................... | 416/132 B |
| 2006/0131890 | A1 | 6/2006 | Gizara | |
| 2007/0036653 | A1 | 2/2007 | Bak et al. | |
| 2007/0138798 | A1 | 6/2007 | McClintic | |
| 2008/0240923 | A1 | 10/2008 | Bonnet | |

* cited by examiner

*Primary Examiner* — Richard Edgar
(74) *Attorney, Agent, or Firm* — Glenn E. Gold; Gold & Rizvi, P.A.

(57) ABSTRACT

A wind driven energy source is providing integrated a series of radially extending masts from a central hub. The masts are supported by a series of cables. A mast-to-mast tension cable spans between distal ends of adjacent masts. A mast-to-axle tension cable spans between the distal end of each mast and each axial end of the central hub. A turbine blade is supported by each mast. The turbine blades can be of a rigid or pliant material. An angle of incidence of the rigid blades can be adjusted by rotating the mast. An angle of incidence of the pliant blades can be adjusted by applying tension to a blade control cable. Pliant blades can be retracted into the mast via a retracting mechanism to reduce the exposed surface area when subjected to excessive wind speeds.

21 Claims, 14 Drawing Sheets

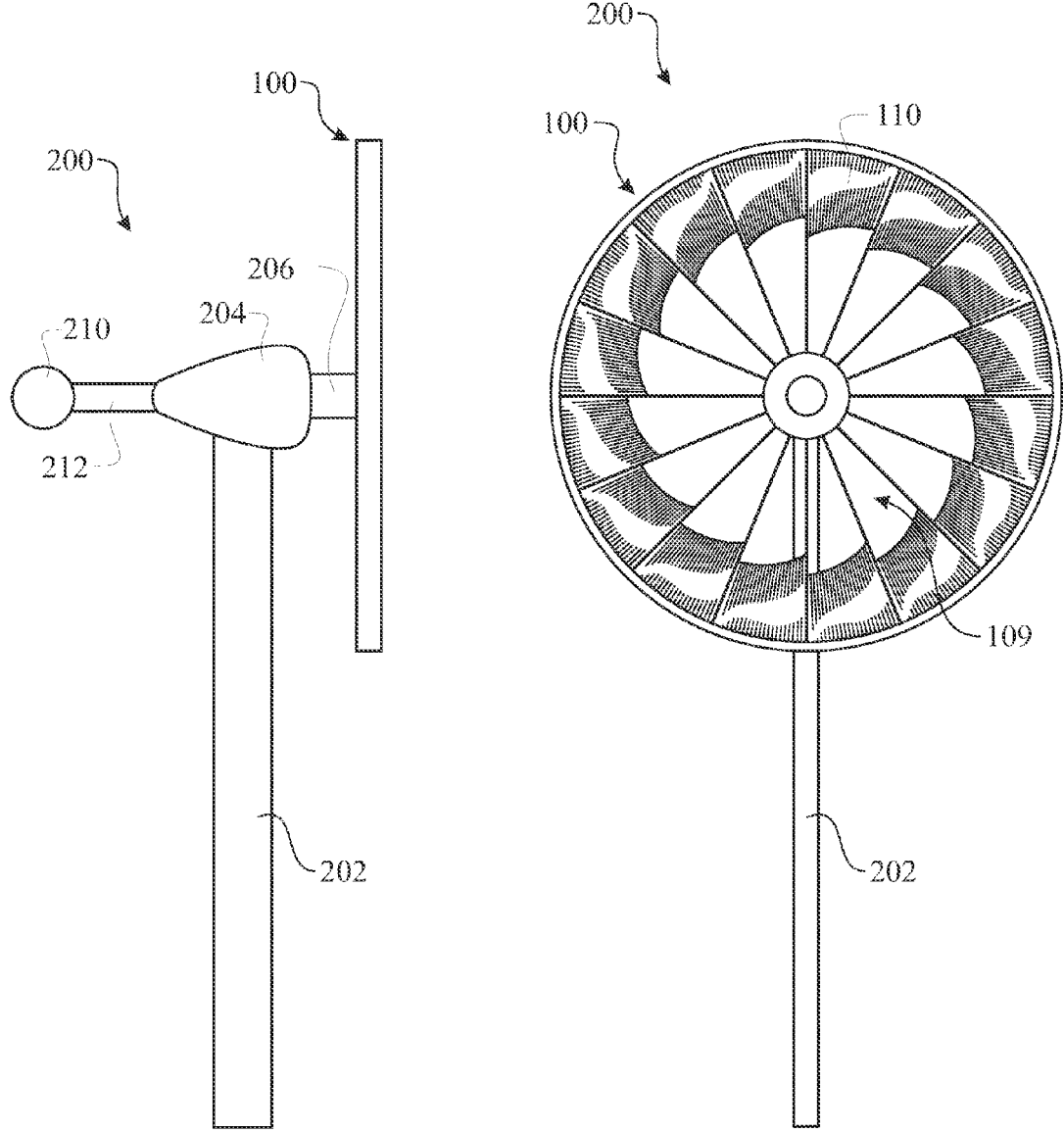
*FIG. 10*  *FIG. 11*

# TURBINE WHEEL

CROSS-REFERENCE TO RELATED APPLICATION

This Continuation-In-Part Utility application claims the benefit of co-pending U.S. Non-Provisional Patent Application Ser. No. 12/496,769, filed on Jul. 2, 2009, which is incorporated herein in its entirety.

FIELD OF THE INVENTION

The present disclosure generally relates to an apparatus and method for converting wind or water flow to electrical energy. More particularly, the present disclosure relates to a turbine wheel having a plurality of blades disposed about an internal edge of a peripheral rim.

BACKGROUND OF THE INVENTION

Windmills and other wind driven turbines generally comprise a series of blades projecting radially from a centrally located hub. This configuration provides several limitations. A first limitation is efficiency. The energy utilized to turn an object is referred to as torque. The torque is calculated at a force times a distance from the center of rotation. The force applied near the center of rotation has a significantly lower impact than a force applied towards the outer edge of the blades, although resistance is created along the entire length of the blade. A second limitation is the potential injury or death to birds. Turbines of common windmills have a plurality of blades, which are spatially configured, allowing birds to fly between the swirling turbines. This poses a risk whereby one of the blades could collide with the passing bird.

A first known blade discloses a rotor blade, which includes a main blade and an extension nap, which is translationally moveable relative to the main blade. The main blade and transition blade at least form an airfoil lifting surface of the entire blade. The dimension of the airfoil lifting surface is variable by translationally moving the extension flap relative to the main blade 10.

A second known reference discloses self starting vertical-axis wind turbine, for economically competitive power production by driving large grid-corrected AC generators. The wind turbine includes a variable blade pitch-angle from 0 to 60 degrees, wherein the blades following variable wind speed for maximum efficiency and to keep constant turbine speed; a variable blade camber to optimize lift-to-drag ratio, controlled by pitch and cyclical variation of incidence-angle; improved airfoil shape of cambered blades; low cost automatic gear-train for two constant turbine speeds; protection against overload and prevention of power surge during wind gusts; low stress three-legged high tower assembled with nacelle and tail structure on ground level. This enables a tower to be built to any height required to harness maximum wind energy.

Yet another known embodiment discloses a wind or water flow energy converter that includes a wind or water flow actuated rotor assembly. The rotor includes a plurality of blades; the blades of are variable in length to provide a variable diameter rotor. The rotor diameter is controlled to fully extend the rotor at low flow velocity and to retract the rotor, as flow velocity increases such that the loads delivered by or exerted upon the rotor do not exceed set limits.

While another known embodiment discloses a rotation shaft which is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

And another known embodiment discloses a multi-axis turbine with an external upper covering, a tower structure with a plurality of vertical elongated members connected to each other with supporting horizontal elongated members, and a plurality of smaller blades on a rotation connected to a tower structure with a plurality of the rotation. One embodiment includes impact impellers connected to a rotation creating a swept area with a height to diameter ratio of greater than four. In one embodiment the impact impellers are connected to a rotation means thereby creating a swept area with a height to diameter ratio of greater than ten.

While another embodiment discloses a power plant which extracts energy from a free flowing fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

Yet another embodiment discloses a design of a wind turbine blade and a wind turbine by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. A method of controlling the wind turbine is also disclosed.

While another embodiment discloses a wind turbine system, which incorporates a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor, which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

And another embodiment discloses a wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the: wind turbine can be operated with a maximum output within the range of evading fatigue failure of the blades and rotor by adjusting the active annular plane area in accordance with wind speed.

Common windmills comprise a plurality (generally three) of masts or blades extending from a central hub. The design of the blades must be structurally sound to accommodate the applied forces. This requirement dictates a heavier construction to the masts or blades. The heavy construction increases the inertial force, which reduces the rotational speed of the turbine assembly. The mass of material increases the cost of fabrication, transport, and the like to the site. Alternately, exotic materials and structural designs can be used to reduce the weight, while increasing cost and complexity of fabrication.

Therefore, a wind driven turbine wheel with improved efficiency and a focus on bird safety is needed.

SUMMARY OF THE INVENTION

The present disclosure is generally directed to a wind driven turbine, and more specifically to a turbine blade having a peripheral rim assembled to a central hub via a plurality of spokes. A series of airfoil blades are disposed along an interior edge of the peripheral rim, being rotationally attached to the plurality of spokes. The blades leave an airflow breach between an interior edge of the blade and the central hub.

In some embodiments, the wind turbine apparatus may include:

a peripheral rim having a rim radius defined from a rim center to an interior edge of the rim;

a central hub having a hub radius defined from a hub center to an exterior edge of the hub;

a radial span dimension being defined as rim radius minus the hub radius;

a plurality of spokes assembling the central hub to a rotationally centralized position within the peripheral rim; and a series of blades having a radial length being significantly less than the radial span dimension;

wherein the each of the blades is assembled to the wind turbine apparatus positioning the blades within the peripheral ring and proximate the interior edge of the rim, leaving an airflow gap between an interior edge of the blades and the exterior edge of the hub.

In another aspect, a leading edge of the blade is rotationally assembled to a spoke.

In still another aspect, a trailing edge is assembled to the spoke via an adjusting mechanism.

In yet another aspect, the adjusting mechanism is operationally controlled via a feature within the respective spoke.

In another aspect, the adjusting mechanism is operationally controlled via a feature within the respective spoke by rotating the spoke or a member within the spoke.

While another aspect configures the plurality of spokes having two adjacent spokes overlapping.

In still a further aspect, the adjusting mechanism is operationally controlled via a tension member which is provided through a hollow portion of the spoke and controlled via a winding mechanism located proximate or within the central hub.

In yet another aspect, the trailing edge is assembled to a spoke via a breakaway mechanism.

In another aspect, the break away mechanism further comprising a means for automatically restoring the trailing edge to an operable configuration.

In a still further aspect, breakaway mechanism is integrated with the adjusting mechanism.

In another aspect, the turbine wheel engages with an electrical power generator, with the assembly being positioned upon a vertical riser support.

In still another aspect, the deployed turbine wheel can include a counterbalance assembly.

In yet another aspect, the deployed assembly can additionally include a rotational means, rotating about a vertical axis to reduce the frontal area respective to the airflow.

In another aspect, the turbine wheel comprises a plurality of masts extending radially from an axle, each mast comprising a blade. The masts are supported via a planar tension cable spanning between distal ends of adjacent masts and a radial tension cable spanning between the distal end of each mast and each of the two ends of the axle.

In another aspect, the blades can be replaceable with one's having different shapes, sizes, surface areas, and aerodynamic characteristics.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 10 presents an elevation side view of a turbine wheel integrated into a wind power harnessing structure;

FIG. 11 presents an elevation front view of the wind power harnessing structure of FIG. 10;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

Figure 1:
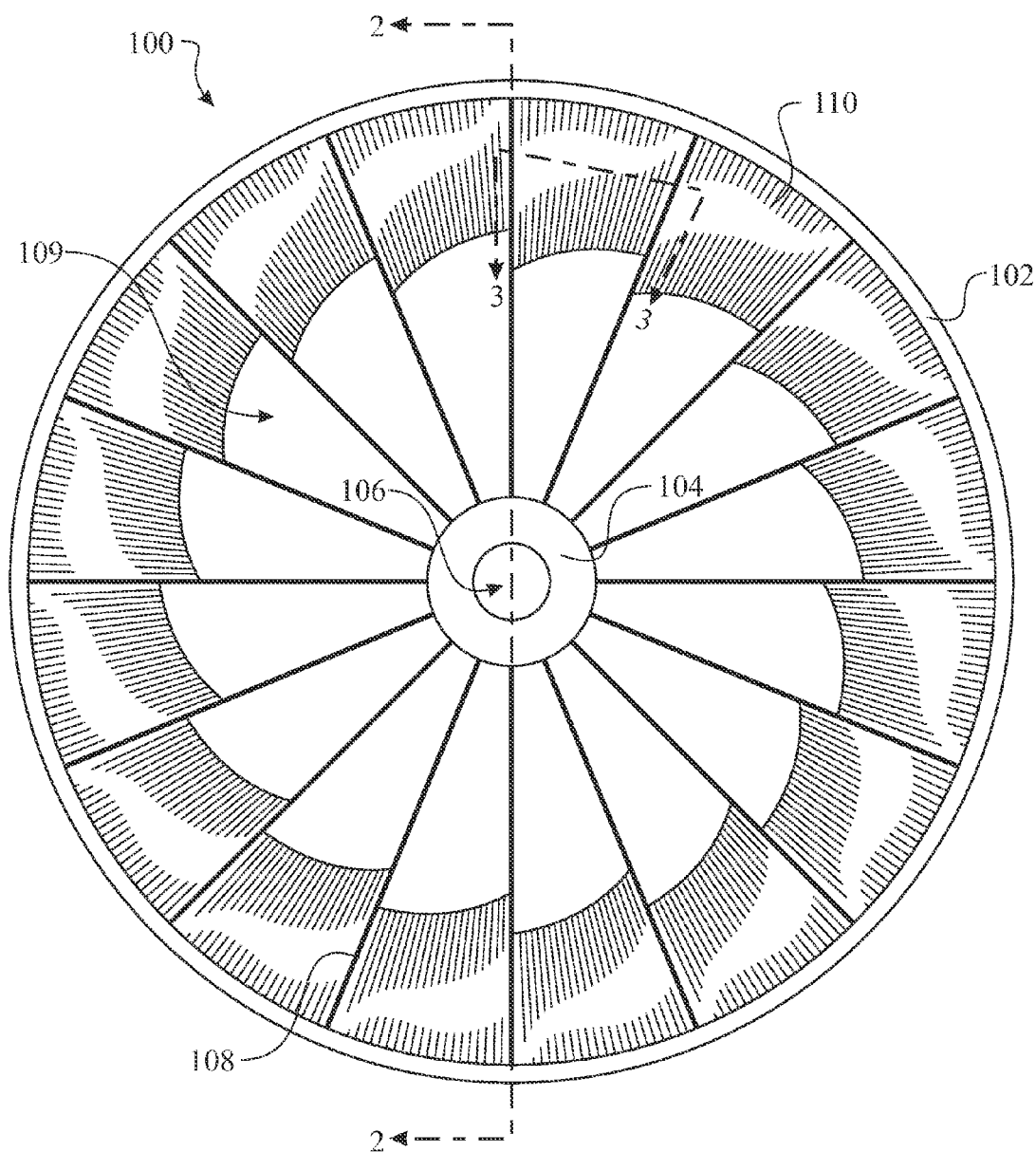
FIG. 1 presents a front view of an exemplary embodiment of a turbine wheel illustrating the general components of the present invention.

For purposes of description herein, the terms "upper", "lower", "left", "rear", "right", "front", "vertical", "horizontal", and derivatives thereof shall relate to the invention as oriented in FIG. 1, where applicable. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally directed to a turbine wheel 100 and the integration of the turbine wheel 100 onto a turbine deployment assembly 200. The turbine wheel 100 and the respective application are detailed hereinafter.

Figure 2:
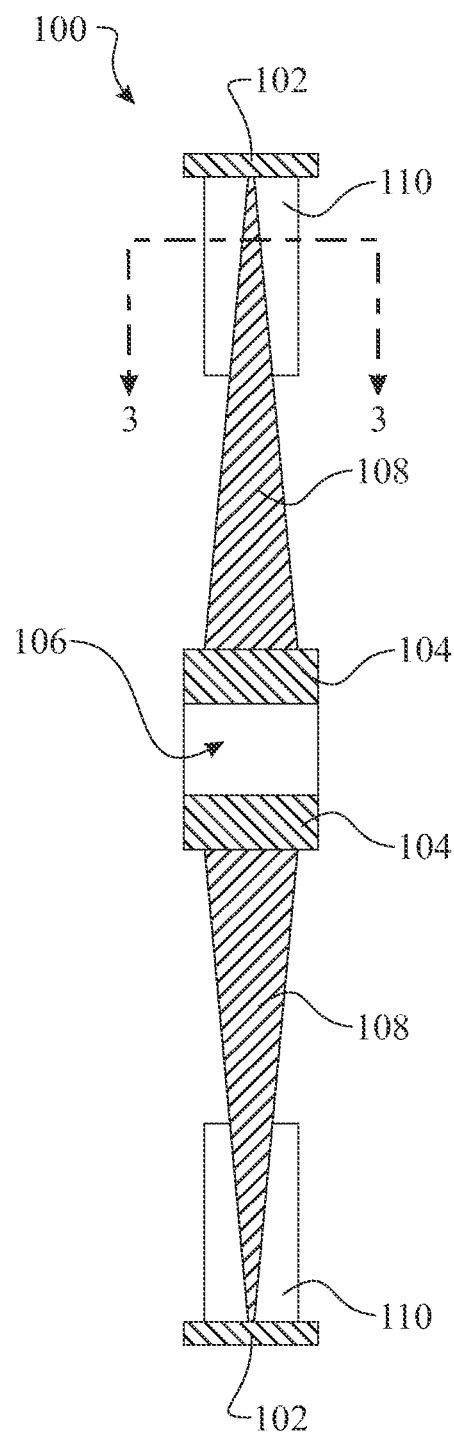
FIG. 2 presents a sectional side view of the turbine wheel taken along section line 2-2 of FIG. 1.
Figure 3:
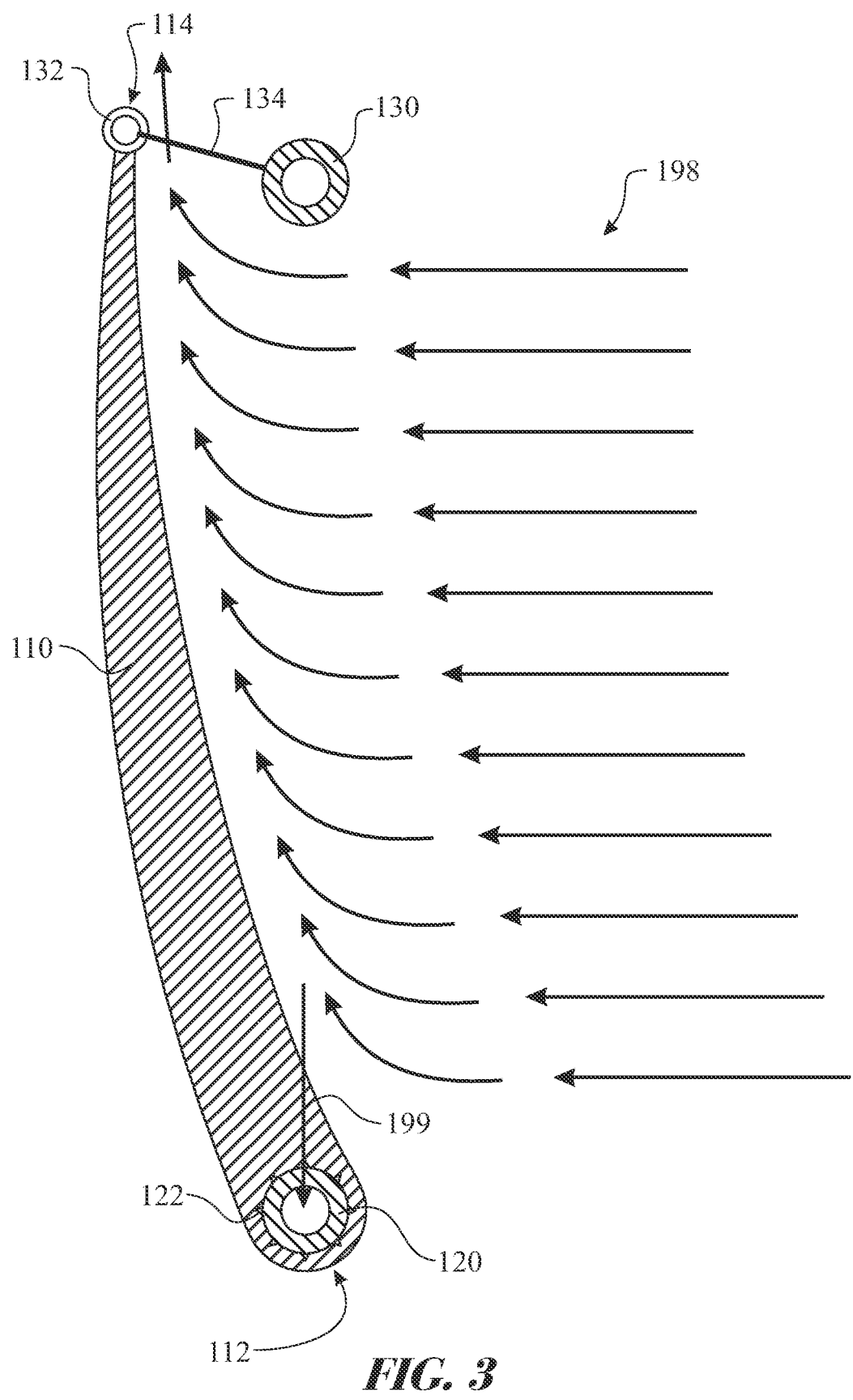
FIG. 3 presents a sectional end view of a turbine blade taken along section line 3-3 of FIG. 1 introducing an effect of wind flow on the blade.

Referring initially to FIGS. 1 through 3 of the drawings, an illustrative embodiment of a turbine wheel, hereinafter apparatus, is generally indicated by reference numeral 100 in FIG. 1. The turbine wheel assembly 100 includes a turbine center hub 104 being centrally assembled to a turbine outer rim 102 via a plurality of turbine spokes 108. The turbine center hub 104 includes an axle bearing 106, which is centrally assembled, allowing the turbine center hub 104 to rotate about an axle that would be assembled to the axle bearing 106. The axle and axle bearing 106 can be of any known rotational interface capable of supporting the forces exerted by the wind and respective motion of the turbine wheel assembly 100 about the axle. The turbine spokes 108 are preferably assembled having a tensile force. The distributed tensile force ensures the turbine outer rim 102 remains in the circular shape, while reinforcing the assembly.

A series of turbine blades 110 are provided, having a blade leading edge 112 and a blade trailing edge 114. The distance between the blade leading edge 112 and the blade trailing edge 114 is preferably equal to or greater than a span between two adjacent spokes 108. This shape allows for the blade leading edge 112 to be assembled to a respective lead turbine spoke 108 and the blade trailing edge 114 to be assembled to the respective trailing turbine spoke 108. It would be preferable that the blade leading edge 112 be pivotally assembled to a blade leading edge pivot 120, wherein the blade leading edge pivot 120 can be utilized as the lead turbine spoke 108. The blade leading edge pivot 120 can include a hollow centerline, allowing the turbine spoke 108 to be inserted therethrough. A plurality of anti-slip interface 122 can be included ensuring the blade leading edge pivot 120 rotates in conjunction with the turbine blades 110, or excluded allowing the blade leading edge pivot 120 to rotate independently respective to the turbine blades 110.

The turbine blades 110 has a length parallel to the turbine spoke 108 that is significantly shorter than the distance between the exterior of the turbine center hub 104 and the interior of the turbine outer rim 102. This provides an airflow interior region 109 within an interior of the turbine outer rim 102 allowing airflow 198 to pass through the turbine wheel assembly 100. This configuration provides a centroid of the effective force closer to the turbine outer rim 102, thus increasing the generated torque, reduces the rotational resistance, thus increasing the efficiency.

The trailing edge can include an incident angle control mechanism, including an incident angle controller 130, an angle control cleat 132 and an angle control tether 134. In the exemplary embodiment, the turbine blade 110 pivots about the blade leading edge pivot 120 and is retained at an incident angle via the angle control tether 134. The angle control tether 134 is a cabling, which is released or retracted via an incident angle controller 130. The incident angle controller 130 can either rotate to adjust a released length of the angle control tether 134, or the angle control tether 134 can be routed through the incident angle controller 130 and released or retracted via a remotely located winding mechanism (not shown, but well understood as a motor, gearing and spool). The angle control tether 134 is secured to the turbine blades 110 via an angle control cleat 132 located proximate the blade trailing edge 114 of the turbine blades 110.

Figure 4:
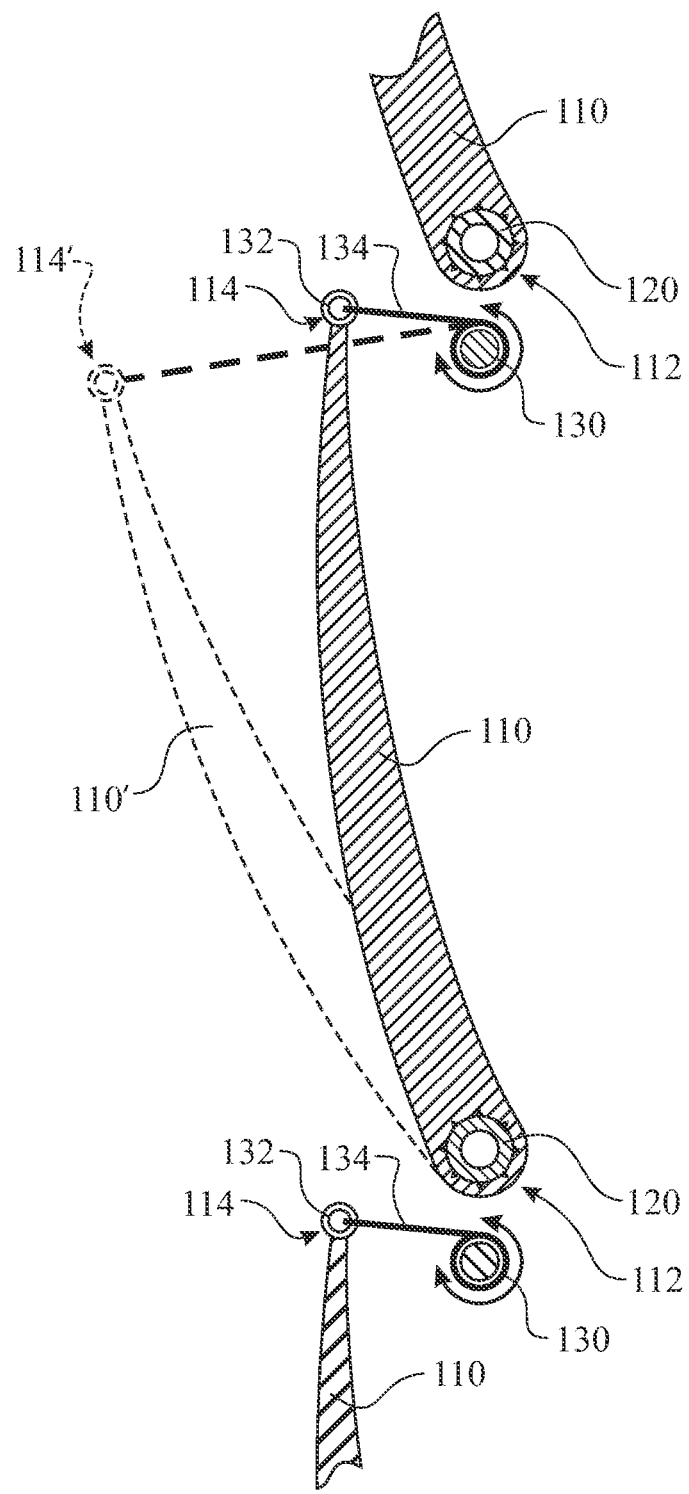
FIG. 4 presents a sectional end view of a series of turbine blades introducing an incident angle controlling mechanism.

As the incident angle controller 130 releases the angle control tether 134, a wind flow 198 applies a force to the facing side of the turbine blades 110 allowing the turbine blades 110 to rotate into position turbine blades 110' and repositioning the blade trailing edge 114 to position blade trailing edge 114' as shown in FIG. 4. The illustration presents an embodiment where the incident angle controller 130 is solid and rotates to release or retract the angle control tether 134 to adjust the released length. The angle of incident changes the resultant rotational speed of the turbine blades 110, as referenced as a resultant blade motion 199. The turbine blades 110 are positioned having the blade leading edge 112 overlapping the blade trailing edge 114, with the blade leading edge 112 being arranged on the wind receiving side of the turbine blades 110.

It is understood that other incident angle control mechanisms can be used, including a cam and respective control arm, and the like.

Figure 5:
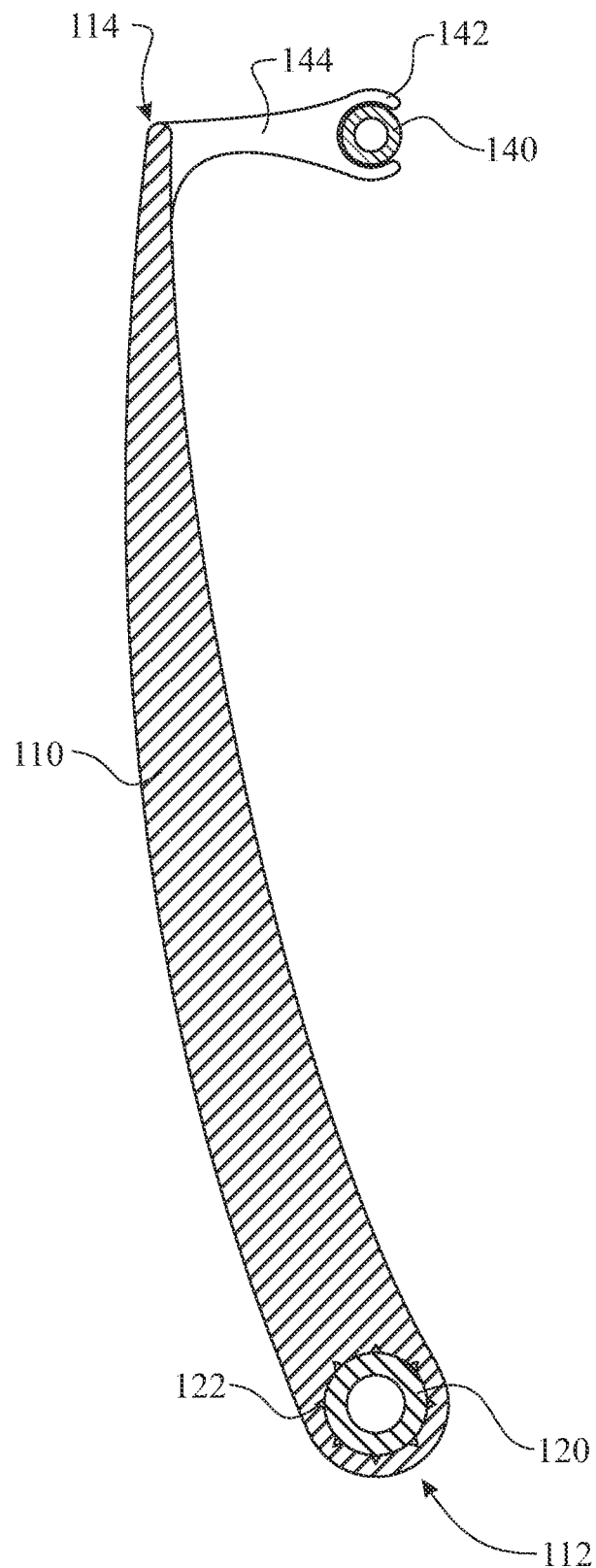
FIG. 5 presents a sectional end view of a turbine blade introducing an exemplary breakaway mechanism.
Figure 6:
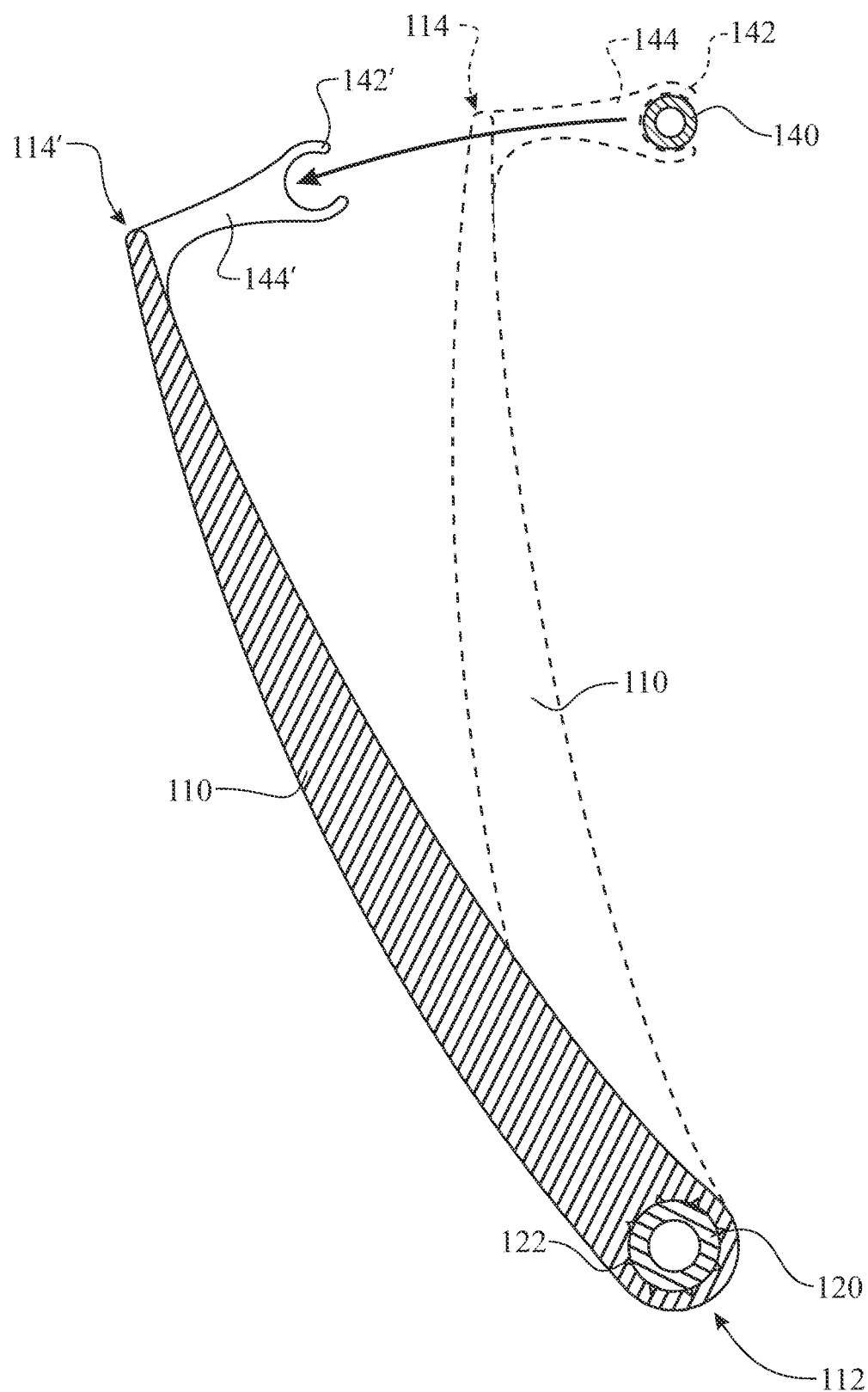
FIG. 6 presents a sectional end view of a turbine blade illustrating the operation of the breakaway mechanism of FIG. 5.

A breakaway mechanism can be incorporated to compensate when the turbine wheel assembly 100 encounters any unexpected excessive wind forces 198. One exemplary embodiment is presented in FIGS. 5 and 6. The breakaway mechanism detachably engages a breakaway clip 142 with a breakaway anchor 140. The breakaway clip 142 is secured to the blade trailing edge 114 via a breakaway frame 144. The breakaway clip 142 would detach from the breakaway anchor 140 when subjected to a predetermined force. An alternate configuration would utilize the incident angle mechanism of FIGS. 3 and 4. The incident angle controller 130 would include a ratcheting mechanism, which releases or free spools the angle control tether 134 when subjected to a predetermined force. It is understood that other configurations known by those skilled in the art can be integrated with the turbine wheel assembly 100, providing a breakaway mechanism.

Figure 7:
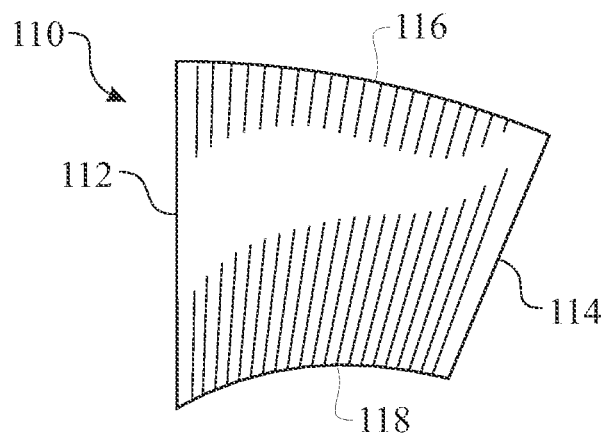
FIG. 7 presents a front view of a first exemplary turbine blade shape.
Figure 8:
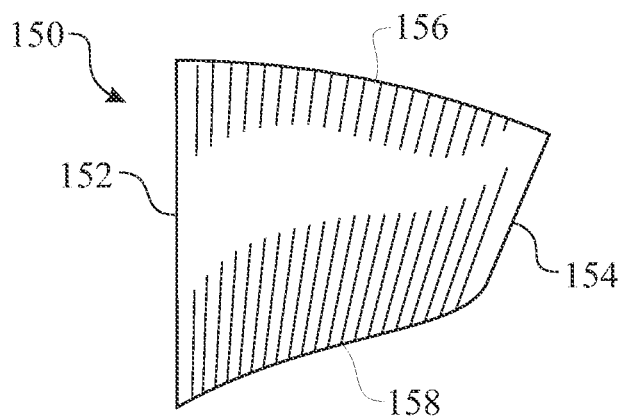
FIG. 8 presents a front view of a second exemplary turbine blade shape.
Figure 9:
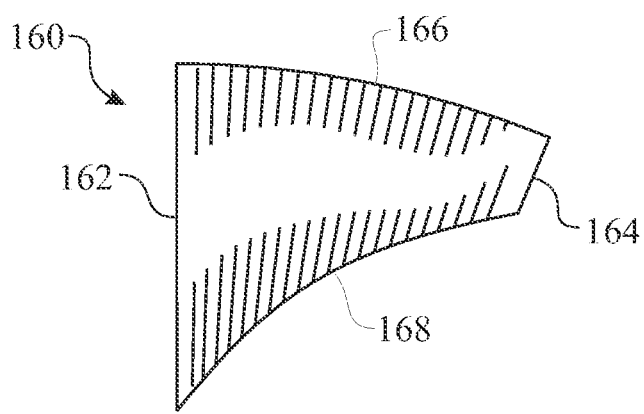
FIG. 9 presents a front view of a third exemplary turbine blade shape.

The turbine blades can be configured in a variety of shapes, as illustrated in FIGS. 7 through 9. A planar view of the turbine blades 110 is presented in FIG. 7, having an airfoil cross sectional shape bounded by a blade leading edge 112, a blade trailing edge 114, a posterior edge 116 and an interior edge 118. The turbine blades can be configured of a variety of cross sectional and peripheral shapes. The configuration defines the total surface area. The surface area, cross sectional shapes and peripheral shape all effect the efficiency of the turbine blades 110. The interior edge 118 provides an arched lower edge wherein the blade trailing edge 114 is equal to or slightly shorter than the blade leading edge 112. A planar view of a turbine blade 150 is presented in FIG. 8, having an airfoil cross sectional shape bounded by a blade leading edge 152, a blade trailing edge 154, a posterior edge 156 and an interior edge 158. The interior edge 158 provides an "S" shaped lower edge having a continuous line blending into the blade trailing edge 114, and wherein the blade trailing edge 114 is shorter than the blade leading edge 112. A planar view of a turbine blade 160 is presented in FIG. 9, having an airfoil cross sectional shape bounded by a blade leading edge 162, a blade trailing edge 164, a posterior edge 166 and an interior edge 168. The interior edge 168 provides an arched shaped lower edge wherein the blade trailing edge 164 is significantly shorter than the blade leading edge 162.

A turbine deployment assembly 200 is illustrated in FIGS. 10 through 15. A vertical riser support 202 provides a base member for the turbine deployment assembly 200. An electrical power generator 204 is pivotally assembled to the upper portion of the vertical riser support 202. The turbine wheel assembly 100 is in rotational communication with the electrical power generator 204 via a turbine wheel shaft 206. A counterbalance 210 can be incorporated providing a counterbalance to the turbine wheel assembly 100. The counterbalance 210 would be assembled to the turbine deployment assembly 200 via a counterbalance support beam 212.

Figure 12:
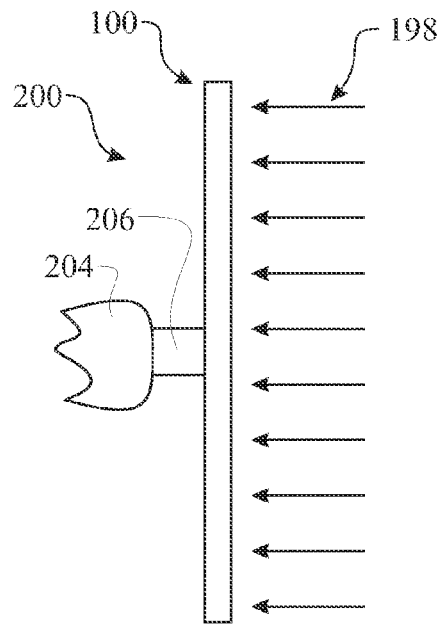
FIG. 12 presents a partial top view of the wind power harnessing structure of FIG. 10, configured, perpendicular to an airflow.
Figure 13:
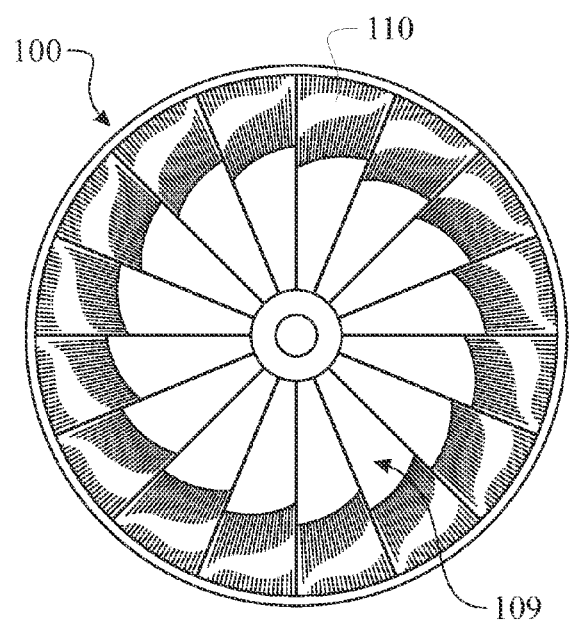
FIG. 13 presents a front view of the turbine wheel configured perpendicular to the airflow.
Figure 14:
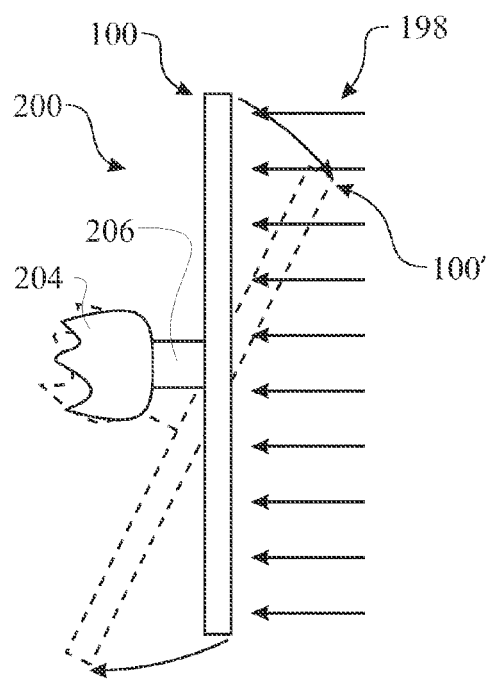
FIG. 14 presents a partial top view of the wind power harnessing structure of FIG. 10, rotated away from being perpendicular to the airflow.
Figure 15:
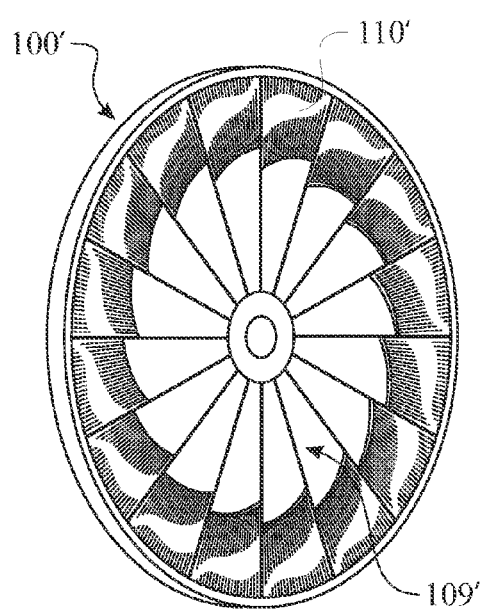
FIG. 15 presents a front view of the turbine wheel, rotated away from being perpendicular to the airflow.

The electrical power generator 204 is designed to rotate about a vertical axis parallel to a longitudinal axis of the vertical riser support 202 as shown in the top views of FIG. 14. The rotation positions the turbine wheel assembly 100 to rotated position turbine wheel assembly 100'. The rotation allows for several capabilities. The first, being positioning the turbine wheel assembly 100 perpendicular to the wind flow 198 as shown in FIG. 12, thus maximizing the frontal surface area as illustrated in FIG. 13. The second, being positioning the turbine wheel assembly 100 at an angle that is not perpendicular to the wind flow 198 as shown in FIG. 14, thus reducing the frontal surface area exposed to the wind flow 198 as illustrated in FIG. 15. This reduces any potential damage from excessive winds. The incident angle mechanism and the break away mechanism both additionally contribute to efficiency, reliability, and protection of the turbine deployment assembly 200.

Figure 16:
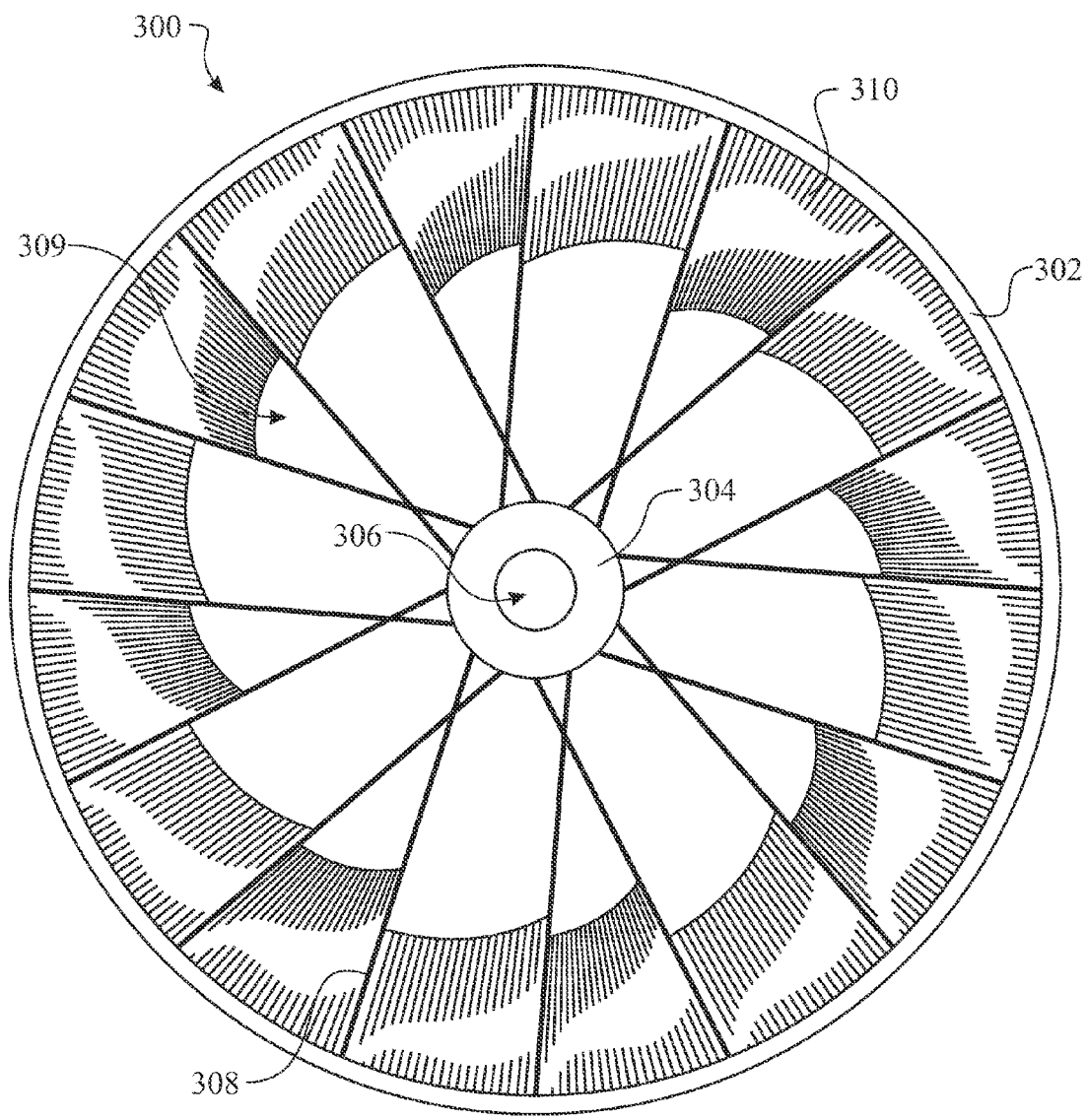
FIG. 16 presents a front view of a second exemplary embodiment of a turbine wheel assembling adjacent spokes in an overlapping configuration.

An alternate spoke configuration is presented in the exemplary embodiment referred to as a crossover spoke turbine wheel assembly 300, illustrated in FIG. 16. The crossover spoke turbine wheel assembly 300 is similar to the turbine wheel assembly 100. Like features of crossover spoke turbine wheel assembly 300 and turbine wheel assembly 100 are numbered the same except preceded by the numeral '3'. The turbine spokes 308 are arranged being fixed to the center hub 304 offset from the radial centerline. The turbine spokes 308 are configured whereby adjacent turbine spokes 308 overlap. The overlap between the spokes 308 occurs proximate the center hub 304.

Figure 17:
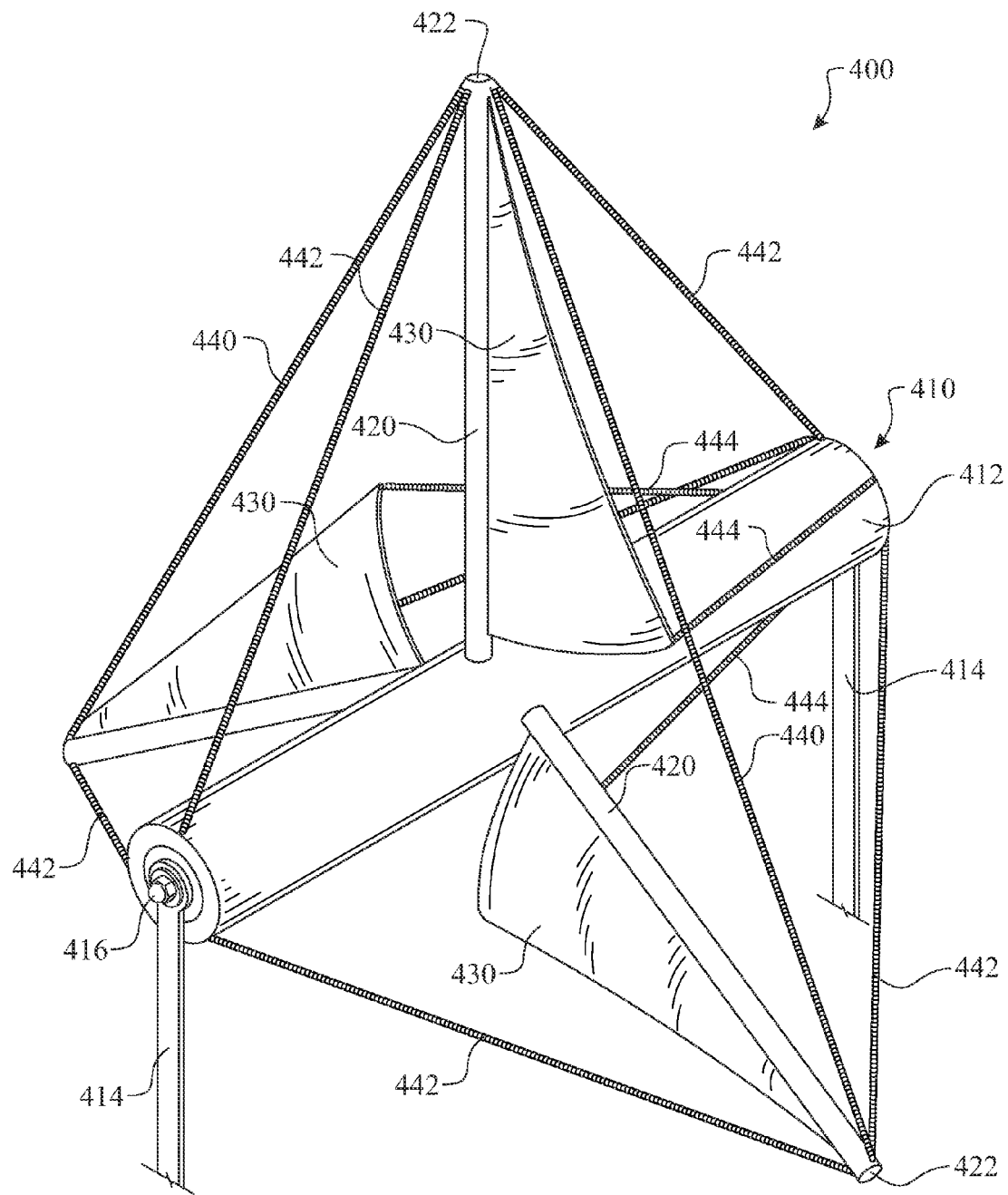
FIG. 17 presents an isometric view of a third exemplary embodiment of a turbine wheel utilizing a plurality of masts supported by an arrangement of tension cables.
Figure 18:
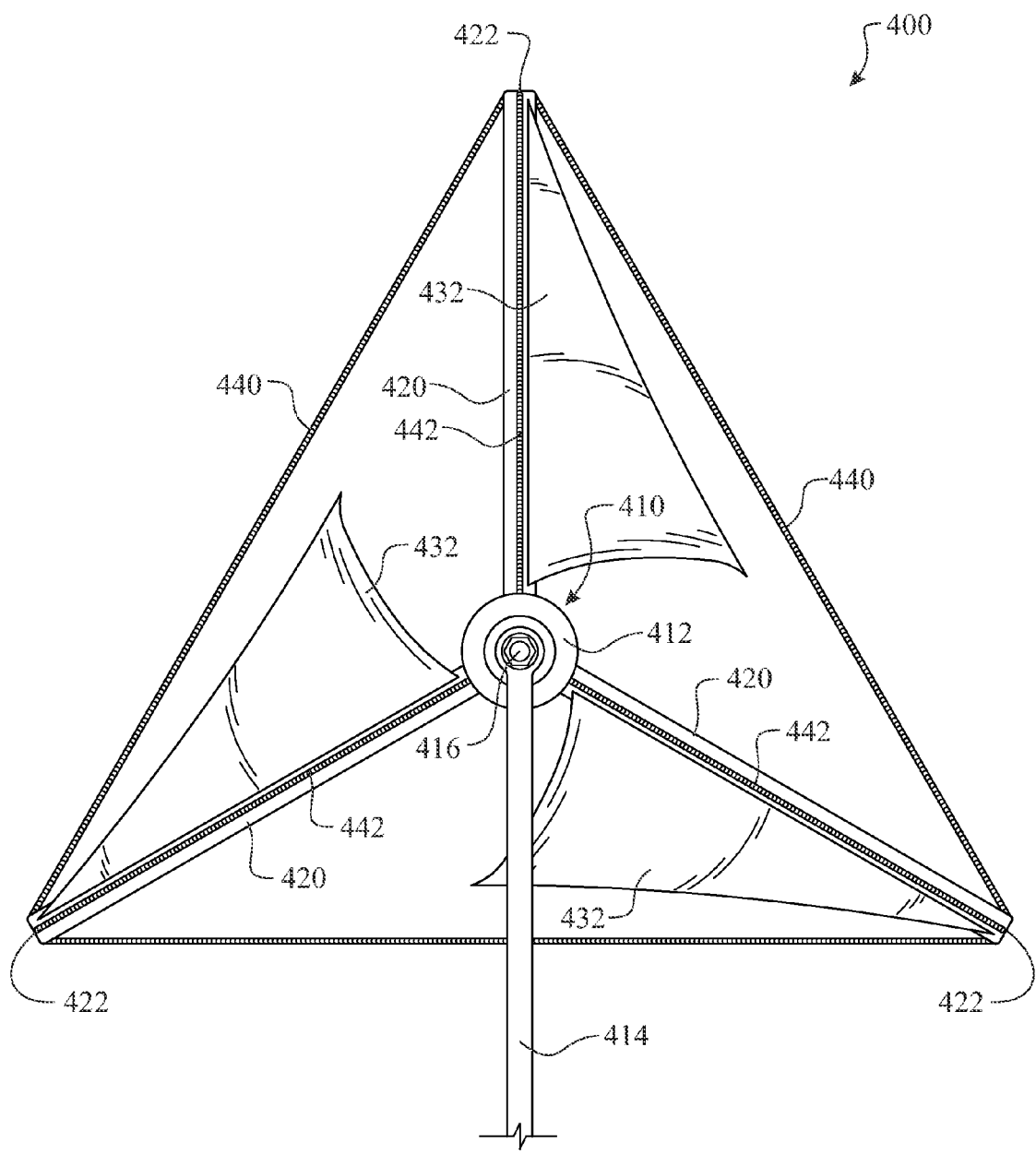
FIG. 18 presents a front elevation view of the third exemplary turbine wheel of FIG. 18.
Figure 19:
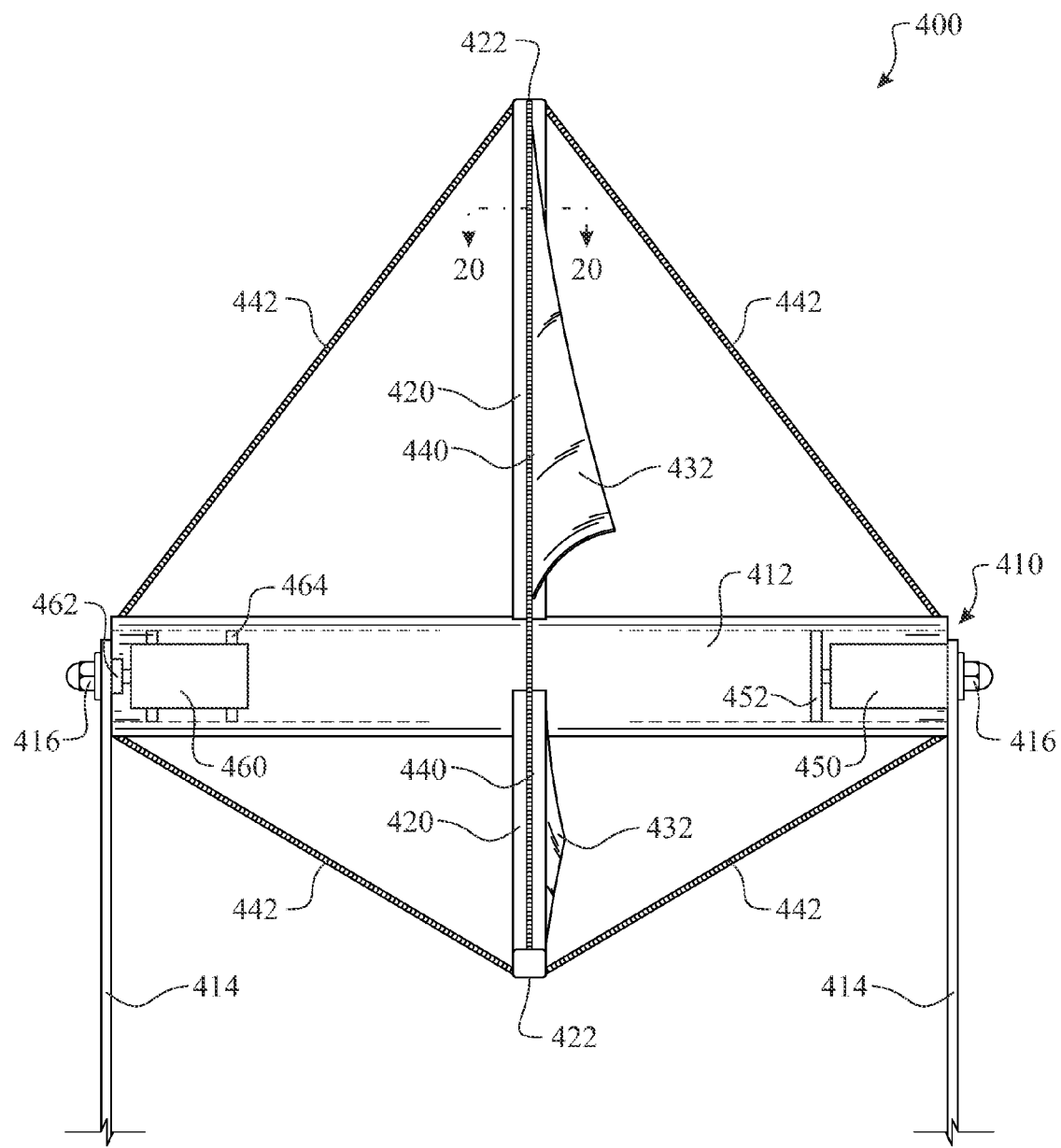
FIG. 19 presents a side elevation view of the third exemplary turbine wheel of FIG. 18.

Another exemplary embodiment is referred to as a cable supported mast turbine assembly 400, illustrated in FIGS. 17 through 19. The cable supported mast turbine assembly 400 is fabricated having a plurality of mast 420 extending radially from a central hub 412 of a power generating central hub assembly 410. The central hub 412 is supported by a pair of hub support members 414; having one hub support member 414 located at each end of the central hub 412. The central hub 412 is rotationally assembled to the hub support member 414 via a hub coupling member 416. A generator is provided in communication with the central hub 412, being placed within the central hub 412, adjacent to the central hub 412, or any other reasonable location. As the central hub 412 rotates, the generator creates electrical power. It is also understood that the rotational motion of the central hub 412 can be mechanically coupled to other objects to drive a motion of the other objects accordingly.

The masts 420 are supported by an arrangement of cabling. Mast-to-mast tension cables 440 span between mast distal ends 422 of each adjacent mast 420. Each mast-to-mast tension cable 440 is tightened having a tensile force equal to the others. The mast-to-mast tension cables 440 provide stability to the mast 420 against a torsional force generated by the rotation of the central hub 412. A mast-to-axle tension cable 442 spans between each end of the central hub 412 and the mast distal end 422 of each of the masts 420. The plurality of mast-to-axle tension cables 442 provides stability against any cross-directed forces, such as wind, vibrations, and the like.

The cables 440, 442 can be secured to the respective member using any reasonable and well-known interface. The interface can include a tensioning member, such as a turnbuckle, and the like. The cables 440, 442 can be fabricated using any of many well-known methods, including a single cable, a series of wrapped or bound smaller cables, and the like. The cross-sectional shape of the mast 420 are preferably aerodynamic, such as round (as shown), wing-shaped, and the like.

A turbine blade can be provided as either a pliant turbine blade 430 or a rigid turbine blade 432. When incorporating the pliant turbine blade 430, the cable supported mast turbine assembly 400 can include a tether or blade tensioning cable 444 spanning between a unattached corner or other region of the pliant turbine blade 430 and a location proximate an axial end of the central hub 412. The blade tensioning cable 444 can be fixed or adjustable. A motor can be utilized to retract or extend the blade tensioning cable 444, adjusting the tautness of the blade tensioning cable 444. A tensioning member can release the blade tensioning cable 444 should the blade tensioning cable 444 be subjected to a force above a predetermined limit, thus avoiding any damage to the cable supported mast turbine assembly 400.

Alternately, the rigid turbine blade 432 can be rigidly affixed to the mast 420. The mast 420 can be pivotally attached to the central hub 412, including a drive mechanism for rotating the mast 420, thus adjusting the angle of incidence of the pliant turbine blade 430.

Figure 20:
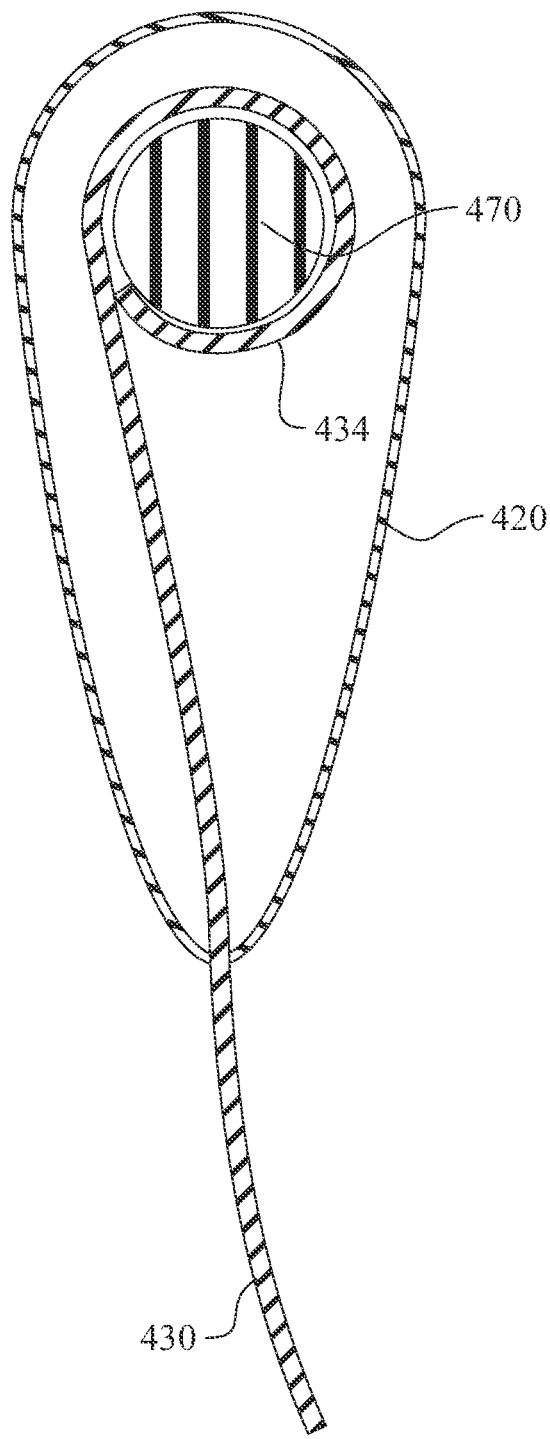
FIG. 20 presents a cross sectional view of the mast taken along section line 20-20 of FIG. 19, the illustration additionally introducing a blade retracting mechanism.

Any additional operational features of the turbine wheel assembly 100 can be applied to the cable supported mast turbine assembly 400. The mast 420 can include a hollow center, allowing the user to retract at least a portion of the pliant turbine blade 430 therein to reduce the exposed surface area thereof as illustrated in FIG. 20. A retracting mechanism 470 can be provided to gather the pliant turbine blade 430 within an interior section of the mast 420. One such means would be to rotate the retracting mechanism 470 collecting the pliant turbine blade 430, storing the excess material in a wrap referenced as a retracted turbine blade portion 434. The retracting mechanism 470 can be an elongated rotating structure such as an axle rotated by a motor or other rotational operating device.

The cable supported mast turbine assembly 400 is provided as a means for generating power. The cable supported mast turbine assembly 400 is designed whereby the central hub 412 is rotated by wind. The rotation of the central hub 412 is then converted into useable energy. A mechanical interface can engage with the central hub 412 to transfer mechanical power to drive a secondary apparatus. The mechanical interface can direct mechanical motion of a secondary apparatus. Alternately, an electricity generating apparatus 450 can engage with the central hub 412 to create electrical power. The electricity generating apparatus 450 can be located within an interior of the central hub 412 or external to the central hub 412. One portion of the electricity generating apparatus 450 remains stable and a second portion of the electricity generating apparatus 450 engages with the central hub 412 to rotate. The rotating motion drives the electricity generating apparatus 450 to create the electrical output. As illustrated on the right side of FIG. 19, the electricity generating apparatus 450 is secured to the hub support member 414. A generator interface 452 is attached to an axle of the electricity generating apparatus 450 and engages with an interior surface of the central hub 412. The central hub 412 rotationally drives the generator interface 452. The generator interface 452 rotates windings of a generator, which pass across fixed stators creating the electrical output. Conversely, as illustrated on the left side of FIG. 19, an electricity generating apparatus 460 can be secured to the interior surface of the central hub 412 via a generator mount 464. A generator interface 462 is attached to a fixed member, such as the hub support member 414. The motion of the central hub 412 causes the electricity generating apparatus 460 to rotate respective to the generator interface 462, thus generating the electrical output.

The turbine assemblies 100, 400 can be utilized for gas flow, such as gaseous flows, such as wind, or fluid flows, such as wave motion, currents, tidal flow, and the like. It is also understood that the turbine assembly 100, 400 can be attached to a moving object. The turbine assembly 100, 400 creates an output power based upon the relative motion between the turbine assembly 100, 400 and a fluid (either gaseous or liquid).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A turbine wheel, comprising:
   a central hub assembly comprising a central hub rotationally engaging with a pair of support members, each support member provided at each respective end of the central hub, wherein the central hub rotates about a central axis;
   at least three masts spatially arranged about a perimeter of the central hub, each mast extending radially from a central section of the central hub;
   a plurality of turbine blades, each of said plurality of turbine blades attached to a respective mast of said at least three masts;
   a plurality of mast-to-mast tension cables, each mast to mast tension cable spanning between distal end of each pair of adjacent masts, the plurality of mast to mast tension cables forming a complete perimeter about the turbine wheel;
   a series of pairs of mast-to-axle tension cables, the first mast-to-axle tension cable spanning between the distal end of each mast and one rotational end of the central hub, the second mast-to-axle tension cable spanning between the distal end of each mast and a second, opposite rotational end of the central hub;
   a tether cable extending from a free end of each turbine blade to one rotational end of said central hub, wherein said tether cable has an adjustable length, wherein a change in said tether cable length affects an angle of incidence of said respective turbine blade; and
   a power converter engaging with the central hub, wherein a power output is generated by a rotational motion of the central hub.

2. A turbine wheel as recited in claim 1, wherein the turbine blades are fabricated of a rigid material.

3. A turbine wheel as recited in claim 2, the masts further comprising a rotational interface for the masts to optimize an angle of incidence of the rigid turbine blades.

4. A turbine wheel as recited in claim 1, wherein the turbine blades are fabricated of a pliant material.

5. A turbine wheel as recited in claim 4, further comprising a retracting mechanism for retracting the pliant turbine blade into the mast.

6. A turbine wheel as recited in claim 1, wherein the power generator is located within an interior of the central hub, the power generator having one portion rotationally engaging with the central hub and a second portion fixed to a stationary member.

7. A turbine wheel as recited in claim 1, wherein the mast is formed having an aerodynamic cross sectional shape.

8. A turbine wheel as recited in claim 1, wherein each blade has a triangular shaped, wherein the shape is bound between the respective mast and the mast-to-mast tension cable.

9. A turbine wheel, comprising:
   a central hub assembly comprising a central hub rotationally engaging with a pair of support members, each support member provided at each respective end of the central hub, wherein the central hub rotates about a central axis;
   at least three masts spatially arranged about a perimeter of the central hub, each mast extending radially from a central section of the central hub;
   a plurality of turbine blades, each of said plurality of turbine blades attached to a respective mast of said at least three masts;
   a plurality of mast-to-mast tension cables, each mast to mast tension cable spanning between distal end of each pair of adjacent masts, the plurality of mast to mast tension cables forming a complete perimeter about the turbine wheel;

a series of pairs of mast-to-axle tension cables, the first mast-to-axle tension cable spanning between the distal end of each mast and one rotational end of the central hub, the second mast-to-axle tension cable spanning between the distal end of each mast and a second, opposite rotational end of the central hub;

a tether cable extending from a free end of each turbine blade to one rotational end of said central hub, wherein said tether cable has an adjustable length, wherein a change in said tether cable length affects an angle of incidence of said respective turbine blade; and an electrical power generator engaging with the central hub, wherein an electrical power output is generated by a rotational motion of the central hub.

10. A turbine wheel as recited in claim 9, wherein the turbine blades are fabricated of a rigid material.

11. A turbine wheel as recited in claim 10, the masts further comprising a rotational interface for the masts to optimize an angle of incidence of the rigid turbine blades.

12. A turbine wheel as recited in claim 9, wherein the turbine blades are fabricated of a pliant material.

13. A turbine wheel as recited in claim 12, further comprising a retracting mechanism for retracting the pliant turbine blade into the mast.

14. A turbine wheel as recited in claim 9, wherein the power generator is located within an interior of the central hub, the power generator having one portion rotationally engaging with the central hub and a second portion fixed to a stationary member.

15. A turbine wheel as recited in claim 9, wherein each blade has a triangular shaped, wherein the shape is bound between the respective mast and the mast-to-mast tension cable.

16. A turbine wheel, comprising:

a central hub assembly comprising a central hub rotationally engaging with a pair of support members, the support member provided at each respective end of the central hub, wherein the central hub rotates about a central axis;

at least three masts spatially arranged about a perimeter of the central hub, each mast extending radially from a central section of the central hub, the at least three masts having an aerodynamic cross sectional shape;

a plurality of turbine blades, each of said plurality of turbine blades attached to a respective mast of said at least three masts;

a plurality of mast-to-mast tension cables, each mast to mast tension cable spanning between distal end of each pair of adjacent masts, the plurality of mast to mast tension cables forming a complete perimeter about the turbine wheel;

a series of pairs of mast-to-axle tension cables, the first mast-to-axle tension cable spanning between the distal end of each mast and one rotational end of the central hub, the second mast-to-axle tension cable spanning between the distal end of each mast and a second, opposite rotational end of the central hub;

a tether cable extending from a free end of each turbine blade to one rotational end of said central hub, wherein said tether cable has an adjustable length, wherein a change in said tether cable length affects an angle of incidence of said respective turbine blade; and an electrical power generator engaging with the central hub, wherein an electrical power output is generated by a rotational motion of the central hub.

17. A turbine wheel as recited in claim 16, wherein the turbine blades are fabricated of a rigid material.

18. A turbine wheel as recited in claim 17, the masts further comprising a rotational interface for the masts to optimize an angle of incidence of the rigid turbine blades.

19. A turbine wheel as recited in claim 16, wherein the turbine blades are fabricated of a pliant material.

20. A turbine wheel as recited in claim 19, further comprising a retracting mechanism for retracting the pliant turbine blade into the mast.

21. A turbine wheel as recited in claim 16, wherein each blade has a triangular shaped, wherein the shape is bound between the respective mast and the mast-to-mast tension cable.

* * * * *